United States Patent
Yamamoto

(10) Patent No.: US 7,561,499 B2
(45) Date of Patent: Jul. 14, 2009

(54) LIGHT FOCUSING OPTICAL SYSTEM, OPTICAL PICKUP DEVICE AND OPTICAL RECORDING AND REPRODUCING DEVICE USING THE SAME, AS WELL AS LIGHT FOCUSING METHOD

(75) Inventor: Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 11/169,657

(22) Filed: Jun. 30, 2005

(65) Prior Publication Data

US 2006/0018210 A1    Jan. 26, 2006

(30) Foreign Application Priority Data

Jul. 21, 2004    (JP)   ............... 2004-213595

(51) Int. Cl.
    *G11B 7/135*    (2006.01)
(52) U.S. Cl. ............... 369/44.23; 369/112.04
(58) Field of Classification Search ........ None
See application file for complete search history.

(56) References Cited

U.S. PATENT DOCUMENTS

| | | | |
|---|---|---|---|
| 2002/0012313 A1* | 1/2002 | Kimura et al. | 369/112.08 |
| 2003/0185134 A1* | 10/2003 | Kimura et al. | 369/112.08 |
| 2003/0210638 A1 | 11/2003 | Yoo et al. | |
| 2003/0231536 A1 | 12/2003 | Mizuno et al. | |
| 2004/0022164 A1 | 2/2004 | Nishioka et al. | |
| 2004/0109242 A1* | 6/2004 | Komma et al. | 359/738 |
| 2004/0257958 A1* | 12/2004 | Kimura et al. | 369/112.03 |

FOREIGN PATENT DOCUMENTS

| | | |
|---|---|---|
| EP | 0 859 356 A2 | 8/1998 |
| EP | 1 001 414 A2 | 5/2000 |
| EP | 1 111 603 A1 | 6/2001 |
| EP | 1 258 871 A2 | 11/2002 |
| EP | 1 304 689 A2 | 4/2003 |
| EP | 1 313 095 A2 | 5/2003 |
| JP | 10-261241 | 9/1998 |
| JP | 2004-87072 | 3/2004 |
| JP | 2004-171722 | 6/2004 |

OTHER PUBLICATIONS

Derwent DWPI Online abstract Accession No. 98-526948/45, JP 10-233036 A, Sep. 2, 1998.
Derwent DWPI Online abstract Accession No. 97-366752/34, JP 08-249718 A, Sep. 27, 1996.

* cited by examiner

*Primary Examiner*—Michael V Battaglia
(74) *Attorney, Agent, or Firm*—Oblon, Spivak, McClelland, Maier & Neustadt, P.C.

(57) ABSTRACT

A light focusing optical system focuses light, for recording to and/or reproducing from a plurality of optical recording media of different kinds, onto the recording media by using a diffraction element and lens. The diffraction element has at least first and second diffractive surfaces. The first diffractive surface diffracts light whose wavelength is 630 nm or more and 670 nm or less to perform aberration correction on an optical recording medium whose cover layer has a thickness of approximately 0.6 mm. The second diffractive surface diffracts light whose wavelength is 400 nm or more and 415 nm or less to perform aberration correction on an optical recording medium whose cover layer has a thickness of approximately 0.1 mm or approximately 0.6 mm.

19 Claims, 7 Drawing Sheets

LIGHT FOCUSING OPTICAL SYSTEM, OPTICAL PICKUP DEVICE AND OPTICAL RECORDING AND REPRODUCING DEVICE USING THE SAME, AS WELL AS LIGHT FOCUSING METHOD

CROSS REFERENCES TO RELATED APPLICATIONS

The present invention contains subject matter related to Japanese Patent Application JP 2004-213595 filed in the Japanese Patent Office on Jul. 21, 2004, the entire contents of which being incorporated herein by reference.

BACKGROUND OF THE INVENTION

1. Field of the Invention

The present invention relates to a light focusing optical system having so-called compatibility in which light for recording to and/or reproducing from a plurality of optical recording media of different kinds is focused onto the optical recording media by using a diffraction element and lens, and particularly relates to a light focusing optical system capable of excellently performing aberration correction on the plurality of recording media of different kinds, and to an optical pickup device and optical recording and reproducing device using this light focusing optical system.

2. Description of the Related Art

In recent years, optical recording media of various types having different recoding densities have been developed, and in case of a disk-shaped optical recording medium, for example, those such as a CD (Compact Disk) using a wavelength of laser light around 780 nm, a DVD (Digital Versatile Disc) using a wavelength thereof around 660 nm, a BD (Blu-ray Disc) using a wavelength thereof around 405 nm, and similarly a HD DVD (High Definition DVD) and AOD (Advanced Optical Disk) using a wavelength around 405 nm, for example, can be mentioned.

In these optical recording media, structures thereof differ from each other, and particularly a thickness of a cover portion on the side irradiated with light, that is, the thickness of a substrate and cover layer differs.

In order to obtain a configuration having compatibility for recording to and/or reproducing from such optical recording media of plural kinds in one optical recording and reproducing device, it is necessary to correct optical aberration in the optical system in consideration of such differences in the thickness of the cover portion and in the wavelength of the irradiated light.

For this purpose, a plurality of objective lenses suitable for respective optical recording media may be provided without difficulties (for example, refer to Patent reference 1).

In a method disclosed in the above-described Patent reference 1, as an optical system having compatibility between a DVD and CD, the one in which two objective lenses suitable for the DVD and CD respectively are installed in one bobbin of a biaxial actuator has been put into a practical use.

However, when a plurality of objective lenses are installed, the biaxial actuator becomes large and there is a disadvantage in the aspects of high-speed operation and miniaturization of an optical system.

Then, a method for recording to and reproducing from a plurality of optical recording media of different kinds by using one objective lens has been proposed.

In an optical recording and reproducing device having the compatibility between the DVD and CD, the aberration caused by the differences in the thickness of the cover portion and in the wavelength is corrected by using a diffractive lens (for example, refer to the Patent reference 2).

[Patent reference 1] Japanese Patent Application Publication No. 2001-110086

[Patent reference 2] Japanese Patent Application Publication No. 2001-160235

SUMMARY OF THE INVENTION

In recent years, with the BD and HD DVD being put into practical use, it has been desired to obtain an objective lens with which even the BD and HD DVD become compatible in addition to the DVD and CD. However, the BD has a cover portion whose thickness is approximately ⅙ the thickness of a cover portion of a DVD, and the wavelength for the BD is around 405 nm which is short. Further, a numerical aperture NA of the objective lens becomes large correspondingly to the BD, and a working distance WD of a lens which moves between an objective lens and a surface of an optical recording medium is typically short. Furthermore, in the BD, a difference in the amount of spherical aberration from that of the DVD and CD becomes enormously large. Here, the spherical aberration is typically obtained from the following formula.

$$\text{Spherical aberration} = NA^4 \times d/\lambda$$

NA=Numerical Aperture
d=Thickness of Cover Layer
$\lambda$=Wavelength

Accordingly, a method of using an objective lens in combination with a diffraction grating has also been studied; however, a practical use thereof is difficult due to such a reason that a pitch of the diffraction grating is considerably minute to the extent of 5 μm.

Moreover, in the BD, it is necessary to make a lens larger in order to enlarge the working distance WD, and as a result there is such an inconvenience that a focal length becomes large and the chromatic aberration increases.

The present invention is proposed in view of the above-described problems, and it is desirable to obtain compatibility between the BD or HD DVD and the DVD and CD by means of a configuration including one objective lens and a diffraction grating in a light focusing optical system having an objective lens that is used in combination with a diffraction grating.

A light focusing optical system according to an embodiment of the present invention includes a diffraction element and lens with which light for recording to and/or reproducing from a plurality of optical recording media of different kinds is focused onto the optical recording media, in which the diffraction element has at least first and second diffractive surfaces; the first diffractive surface diffracts light whose wavelength is 630 nm or more and 670 nm or less to perform aberration correction on an optical recording medium whose cover layer on which light is incident has a thickness of approximately 0.6 mm; and the second diffractive surface diffracts light whose wavelength is 400 nm or more and 415 nm or less to perform aberration correction on an optical recording medium whose cover layer on which light is incident has a thickness of approximately 0.1 mm or approximately 0.6 mm.

Further, in the above-described light focusing optical system according to an embodiment of the present invention, the second diffractive surface has positive surface power.

Further, in the above-described light focusing optical system according to an embodiment of the present invention, a diffraction grating is provided on a boundary surface where materials having different wavelength dependence in a refractive index are joined to form the second diffractive surface.

Further, in the above-described light focusing optical system according to an embodiment of the present invention, the diffraction grating is formed by joining first and second elements.

Further, in the above-described light focusing optical system according to an embodiment of the present invention, the light focusing optical system including the diffraction element is provided with at least one aspheric surface having negative refractive power.

Further, in the above-described light focusing optical system according to an embodiment of the present invention, the aspheric surface having the negative refractive power is provided on the light source side of the first and second diffractive surfaces.

Furthermore, an optical pickup device according to an embodiment of the present invention has a light focusing optical system in which light for recording to and/or reproducing from a plurality of optical recording media of different kinds is focused onto the recording media, including: a light source that emits light, a diffraction element on which the light emitted from the light source is incident, and a lens that focuses light from the diffraction element toward the optical recording medium, in which the diffraction element has at least first and second diffractive surfaces; the first diffractive surface diffracts light whose wavelength is 630 nm or more and 670 nm or less to perform aberration correction on an optical recording medium whose cover layer on which light is incident has a thickness of approximately 0.6 mm; and the second diffractive surface diffracts light whose wavelength is 400 nm or more and 415 nm or less to perform aberration correction on an optical recording medium whose cover layer on which light is incident has a thickness of approximately 0.1 mm or approximately 0.6 mm.

Furthermore, an optical recording and reproducing device according to an embodiment of the present invention has at least a light focusing optical system in which light for recording to and/or reproducing from a plurality of optical recording media of different kinds is focused onto the optical recording media including: a light source that emits light, a diffraction element on which the light emitted from the light source is incident, and a lens that focuses light from the diffraction element toward the optical recording medium, in which the diffraction element has at least first and second diffractive surfaces; the first diffractive surface diffracts light whose wavelength is 630 nm or more and 670 nm or less to perform aberration correction on an optical recording medium whose cover layer on which light is incident has a thickness of approximately 0.6 mm; and the second diffractive surface diffracts light whose wavelength is 400 nm or more and 415 nm or less to perform aberration correction on an optical recording medium whose cover layer on which light is incident has a thickness of approximately 0.1 mm or approximately 0.6 mm.

Moreover, A method of focusing light for recording to and/or reproducing from a plurality of optical recording media of different kinds onto the optical recording media by using a diffraction element and lens according to an embodiment of the present invention, includes the steps of: providing the diffraction element with at least first and second diffractive surfaces, the first diffractive surface diffracting light whose wavelength is 630 nm or more and 670 nm or less to perform aberration correction on an optical recording medium whose cover layer on which light is incident has a thickness of approximately 0.6 mm; and the second diffractive surface diffracting light whose wavelength is 400 nm or more and 415 nm or less to perform aberration correction on an optical recording medium whose cover layer on which light is incident has a thickness of approximately 0.1 mm or approximately 0.6 mm.

As described above, according to an embodiment of the present invention, the first and second diffractive surfaces are provided as the diffraction element used in the light focusing optical system, the light whose wavelength is from 630 to 670 nm is diffracted by the first diffractive surface to perform the aberration correction on the optical recording medium whose cover layer on which light is incident has the thickness of approximately 0.6 mm, that is, to perform the aberration correction on the optical recording medium corresponding to the DVD, the light whose wavelength is from 400 to 415 nm is diffracted by the second diffractive surface to perform the aberration correction on the optical recording medium whose cover layer on which light is incident has the thickness of approximately 0.1 mm or 0.6 mm, that is, to perform the aberration correction on the recording medium corresponding to the BD or HD DVD (including AOD), and so the aberration correction for DVD and for BD and HD DVD can be performed excellently by the light focusing optical system having one objective lens and an optical pickup device and an optical recording and reproducing device having the compatibility can be obtained.

As explained above, according to an embodiment of the light focusing optical system of the present invention, there is such effectiveness that the recording and/or reproduction is performed by using the light whose wavelength is 630 nm or more and 670 nm or less to perform the aberration correction excellently on the optical recording medium whose cover layer on which light is incident has the thickness of approximately 0.6 mm; and the recording and/or reproduction is preformed by using the light whose wavelength is 400 nm or more and 415 nm or less to perform the aberration correction excellently also on the recording medium whose cover layer on which light is incident has the thickness of approximately 0.1 mm or 0.6 mm.

Further, according to an embodiment of the light focusing optical system of the present invention, the second diffractive surface is configured to have the positive surface power, and so the recording and/or reproduction is performed by using the light whose wavelength is 400 nm or more and 415 nm or less, and the chromatic aberration can be corrected excellently in the optical recording medium whose cover layer on which light is incident has the thickness of approximately 0.1 mm or 0.6 mm.

Further, according to an embodiment of the light focusing optical system of the present invention, since a diffraction grating is provided on a boundary surface where materials having different wavelength dependence in a refractive index are joined to form the second diffractive surface, the light focusing optical system can be miniaturized to be thin.

Further, according to an embodiment of the light focusing optical system of the present invention, since the diffraction grating is formed by joining first and second elements, the light focusing optical system can be miniaturized to be thin.

Further, according to an embodiment of the light focusing optical system of the present invention, the light focusing optical system including the diffraction element is provided with at least one aspheric surface having negative refractive power, so that a focal position can be adjusted excellently with respect to an optical recording medium on which recording and/or reproduction is performed by using light having a longer wavelength than the wavelength of 670 nm and a configuration having compatibility with a greater variety of optical recording media can be obtained.

Furthermore, according to an embodiment of the light focusing optical system of the present invention, since the aspheric surface having the negative refractive power is provided on the light source side of the first and second diffractive surfaces, the refractive power is distributed over the first and second diffractive surfaces and this aspheric surface having the negative refractive power, and so design flexibility further increases and a decrease in aberration correction accuracy can be controlled.

Moreover, according to an embodiment of the optical pickup device and the optical recording and reproducing device of the present invention, it is possible to provide the optical pickup device and the optical recording and reproducing device capable of excellently performing the aberration correction on both of the optical recording medium whose cover layer on which light is incident has the thickness of approximately 0.6 mm, to which the recording and/or reproduction is performed by using the light whose wavelength is the wavelength of 630 nm or more and 670 nm or less, and the optical recoding medium whose cover layer on which light is incident has the thickness of approximately 0.1 mm or 0.6 mm, to which the recording and/or reproduction is performed by using the light whose wavelength is 400 nm or more and 415 nm or less.

Furthermore, according to an embodiment of a method of focusing light for recording to and/or reproducing from a plurality of optical recording media of different kinds onto the optical recording media by using a diffraction element and lens, the aberration correction can be performed excellently on both of the optical recording medium whose cover layer on which light is incident has the thickness of approximately 0.6 mm, to which the recording and/or reproduction is performed by using the light whose wavelength is the wavelength of 630 nm or more and 670 nm or less, and the optical recoding medium whose cover layer on which light is incident has the thickness of approximately 0.1 mm or 0.6 mm, to which the recording and/or reproduction is performed by using the light whose wavelength is 400 nm or more and 415 nm or less.

BRIEF DESCRIPTION OF THE DRAWINGS

FIGS. 7A to 7D are diagrams showing lateral aberration in the light focusing optical system according to an embodiment of the present invention, in which FIG. 7A shows the aberration in a Y direction when a light beam is incident on a CD in the Y direction orthogonal to an optical axis with a field angle of 0.5°; FIG. 7B shows the lateral aberration in an X direction orthogonal to the Y direction when the light beam is incident on the CD in the Y direction with the field angle of 0.5°; FIG. 7C shows the lateral aberration in the Y direction on the axis with respect to the CD; and FIG. 7D shows the lateral aberration in the X direction on the axis with respect to the CD;

FIGS. 8A to 8D are diagrams showing lateral aberration in the light focusing optical system according to an embodiment of the present invention, in which FIG. 8A shows the aberration in a Y direction when a light beam is incident on a DVD in the Y direction orthogonal to the optical axis with the field angle of 0.5°; FIG. 8B shows the lateral aberration in the X direction orthogonal to the Y direction when the light beam is incident on the DVD in the Y direction with the field angle of 0.5°; FIG. 8C shows the lateral aberration in the Y direction on the axis with respect to the DVD; FIG. 8D shows the lateral aberration in the X direction on the axis with respect to the DVD.

FIGS. 9A to 9D are diagrams showing lateral aberration in the light focusing optical system according to an embodiment of the present invention, in which FIG. 9A shows the lateral aberration in a Y direction when a light beam is incident on a BD in the Y direction orthogonal to the optical axis with the field angle of 0.5°; FIG. 9B shows the lateral aberration in the X direction orthogonal to the Y direction when the light beam is incident on the BD in the Y direction with the field angle of 0.5°; FIG. 9C shows the lateral aberration in the Y direction on the axis with respect to the BD; FIG. 9D shows the lateral aberration in the X direction on the axis with respect to the BD;

DESCRIPTION OF THE PREFERRED EMBODIMENTS

An embodiment for carrying out the present invention is explained hereinafter, however the present invention is not limited to the following example.

Figure 1:
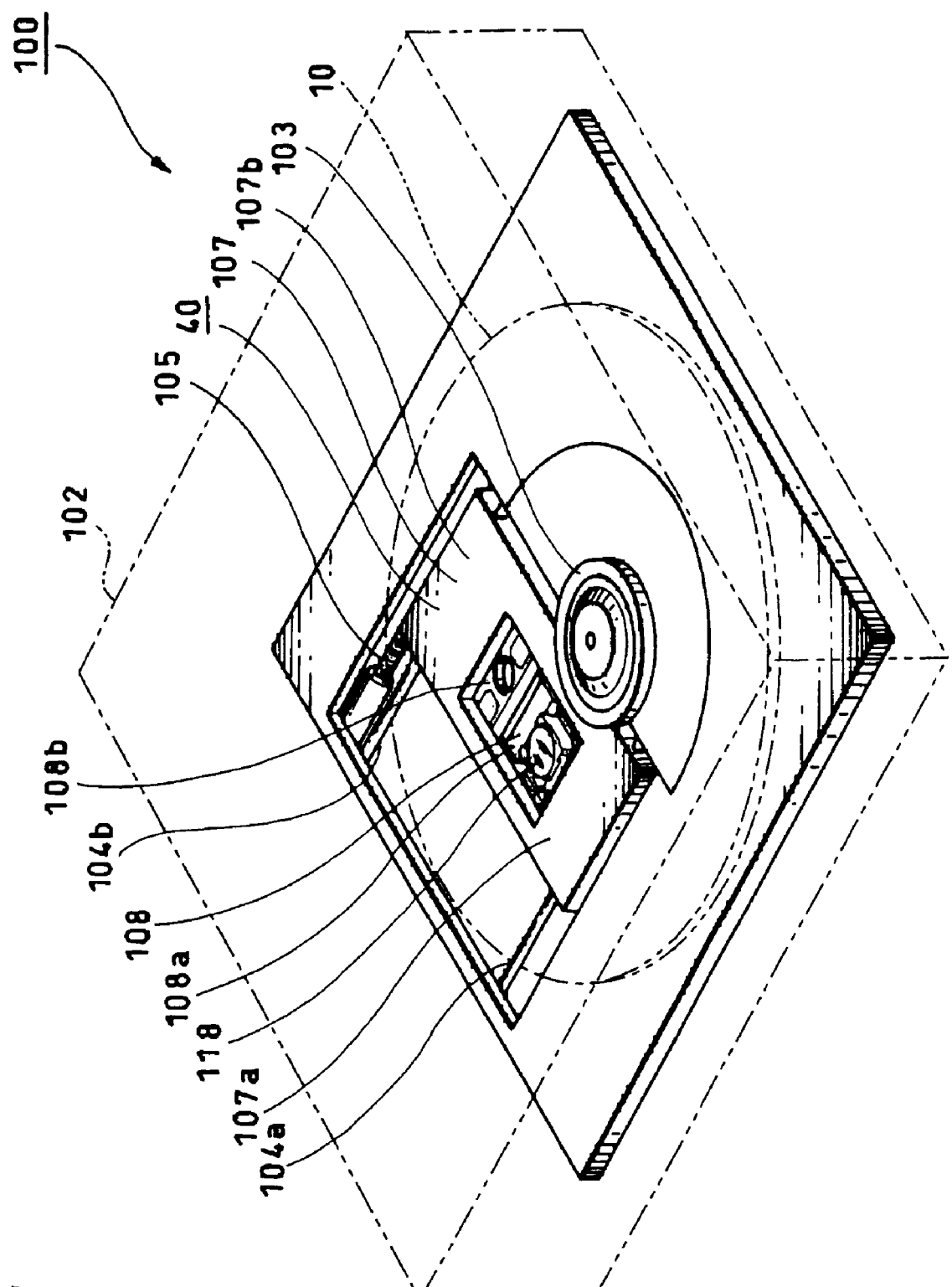
FIG. 1 is a schematic constitutional diagram showing an optical recording and reproducing device according to an embodiment of the present invention.
Figure 2:
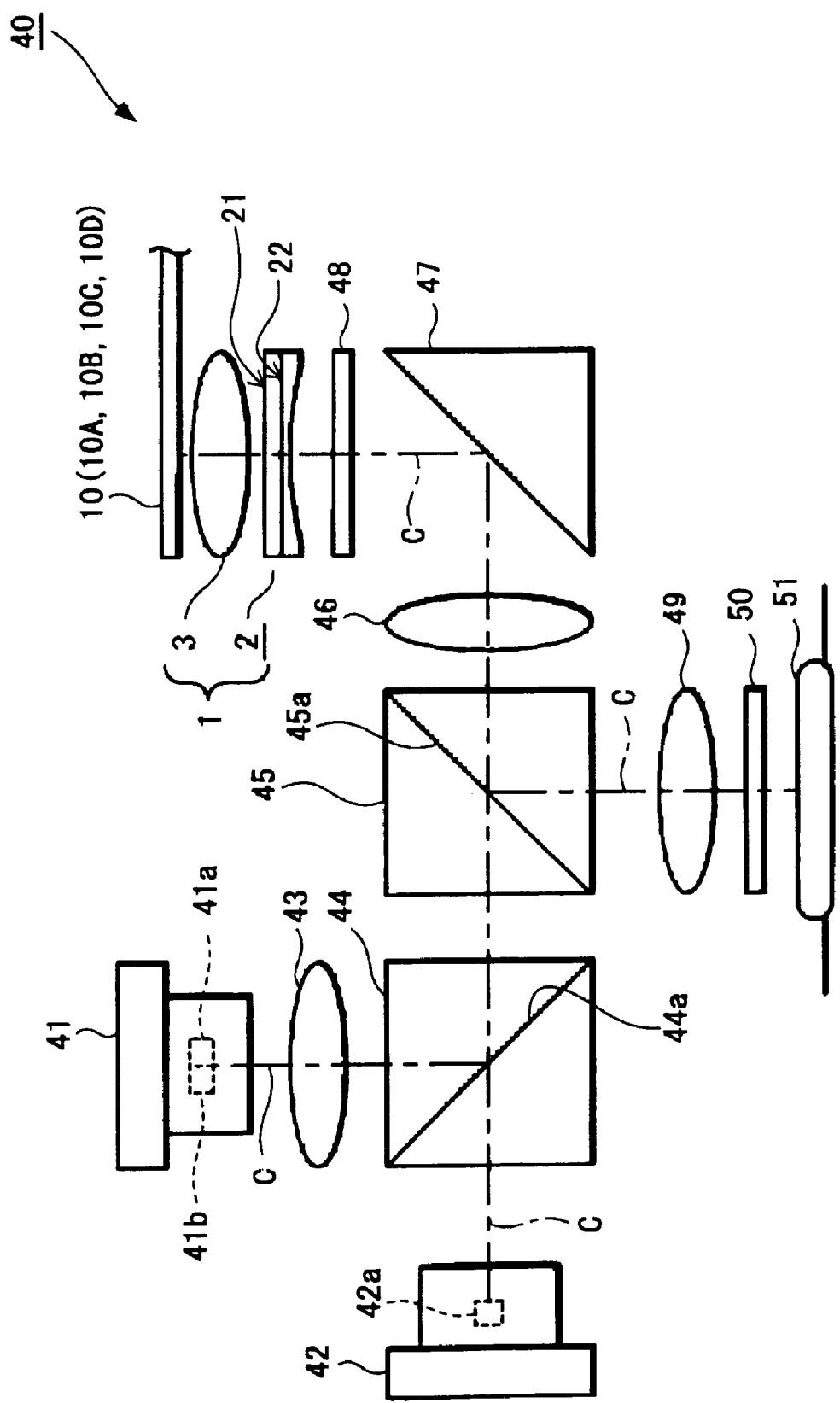
FIG. 2 is a schematic constitutional diagram showing an optical pickup device according to an embodiment of the present invention.

First, an example of an optical recording and reproducing device and optical pickup device suitably applied to the present invention is explained by referring to schematic constitutional diagrams of FIGS. 1 and 2.

As shown in FIG. 1, an optical recording and reproducing device 100 includes an outer case 102 in which each member and each mechanism required are disposed, and an insertion slot for a disk-shaped optical recording medium 10, for example, is provided in this outer case 102 though not illustrated.

Further, a spindle motor, for example, to move the optical recording medium 10 is installed in a chassis (not illustrated) disposed inside the outer case 102, and a disk table 103, for example, is fixed to a shaft of this motor.

On the chassis, parallel guide shafts 104a and 104b are installed, and a lead screw 105 rotated by a feed motor, which is not illustrated, is supported.

An optical pickup device 40 of this optical recording and reproducing device 100 includes a moving base 107, necessary optical parts provided on this moving base 107, and an objective lens drive unit 108 disposed on the moving base 107, and bearing portions 107a and 107b provided at both end portions of the moving base 107 are supported by the guide shafts 104a and 104b, respectively, in a manner of sliding freely. The objective lens drive unit 108 has a movable portion 108a and a fixed portion 108b, and the movable portion 108a is supported by the fixed portion 108b in a manner of moving freely through a suspension not illustrated in the figure. A nut member, not illustrated, provided with the moving base 107 is meshed with the lead screw 105, and when the lead screw 105 is rotated by the feed motor, the nut member is forwarded in a direction in accordance with a rotational direction of the lead screw 105, so that the optical pickup device 40 is movable in the radial direction of the optical recording medium 10 loaded on the disc table 103.

In the optical recording and reproducing device 100 of such configuration, when the disk table 103 is rotated in accordance with a rotation of the spindle motor, the optical recording medium 10 loaded on this disk table 103, that is a BD, DVD, CD, HD DVD, or the like, is rotated, and at the same time, the optical pickup device 40 is moved in the radial direction of the optical recording medium 10 by the above-described mechanism to be capable of moving and facing the whole recording surface of the optical recording medium 10 and a recording operation or reproducing operation is performed at a predetermined track position. At this time, the movable portion 108a of the objective lens drive unit 108 is moved with respect to the fixed portion 108b, and a focusing adjustment and tracking adjustment of an objective lens, described later on, which is provided in the movable portion 108a is performed.

As an optical recording medium 10 used for the optical recording and reproducing device 100 and optical pickup device 40 according to the present invention, a BD 10A, a DVD 10B, a CD 10C, a HD DVD 10D, and the like, for example, can be mentioned as shown in FIG. 2. As to wavelengths of laser light used for these optical recording media 10, the DVD 10B uses laser light of 630 nm or more and 670 nm or less, the CD 10C uses laser light of 760 nm or more and 800 nm or less, and the BD 10A or HD DVD 10D uses laser light of 400 nm or more and 415 nm or less.

In addition, a cover portion of each optical recording medium 10, specifically a thickness of a light transmissive substrate or cover layer on the side irradiated with the light by the objective lens, is approximately 0.1 mm in case of the BD 10A, approximately 0.6 mm in case of the HD DVD 10D; approximately 0.6 mm in case of the DVD 10B, and approximately 1.2 mm, for example, in case of the CD 10C, and as to a numerical aperture NA of an objective lens 3, it is desirable that the DVD 10B, CD 10C, and HD DVD 10D have NA of around 0.65, and the BD 10A have that of around 0.85 in consideration of the wavelength used, thickness of the cover portion, and the like of each optical recording medium.

The optical pickup device 40 includes, for example, a first light source 41 and second light source 42, a coupling lens 43, a light path composing element 44, a beam splitter 45, a collimator lens 46, a raising mirror 47, a ¼ wavelength plate 48, a diffraction element 2, an objective lens 3, a conversion lens 49, an optical axis composing element 50 and a light receiving element 51 as shown in FIG. 2, and those other than the objective lens 3 are disposed in the moving base 107 explained in the above-described FIG. 1 and the lens 3 is provided in the movable portion 108a of the objective lens drive unit 108.

The first light source 41 is configured to have a first light emitting element 41a and a second light emitting element 41b inside thereof, laser light of about 660 nm which corresponds to the DVD 10B, for example, is emitted from the first light emitting element 41a, and laser light of about 780 nm which corresponds to the CD 10C, for example, is emitted from the second light emitting element 41b.

Further, the second light source 42 is configured to have a third light emitting element 42a inside thereof, and laser light of about 405 nm which corresponds to the BD 10A or HD DVD 10D is emitted.

The coupling lens 43 has a function of performing a conversion of an optical magnification factor in a forwarding path of the laser light emitted from the first light source 41.

The light path composing element 44 is made of a beam splitter having a mirror surface 44a capable of selecting wavelength, for example. The laser light having the wavelength of about 660 nm or about 780 nm that is emitted from the first light emitting element 41a or second light emitting element 41b of the first light source 41 is made incident on the light path composing element 44 through the coupling lens 43, and is reflected by the mirror surface 44a of this light path composing element 44. The laser light having the wavelength of about 405 nm that is emitted from the third light emitting element 42a of the second light source 42 is transmitted through the mirror surface 44a.

The beam splitter 45 has a function of transmitting or reflecting incident laser light depending on a difference in a polarization direction, the laser light in the forwarding path is transmitted through a split surface 45a and is made incident on the collimator lens 46, and laser light in a return path is reflected by the split surface 45a and is forwarded to the light receiving element 51.

The laser light made into parallel light by the collimator lens 46 is reflected by the raising mirror 47 with a light path being converted by approximately 90°; the polarization direction is converted by the ¼ wavelength plate 48 to be made incident on the diffraction element 2 of a light focusing optical system 1 having the configuration of the present invention, and as described later on, the aberration correction of the light is performed correspondingly to the wavelength used and thickness of the cover portion of each optical recording medium 10.

Further, the laser light to which the aberration correction is performed by the diffraction element 2 is focused onto a predetermined track position on a recording surface of the optical recording medium 10 (10A, 10B, 10C or 10D) by the objective lens 3.

Then, the laser light reflected from the optical recording medium 10 is made incident on the ¼ wavelength plate 48 through the objective lens 3 and diffraction element 2 and the polarization direction thereof is again converted; and the laser light is reflected by the raising mirror 47 to be transmitted through the collimator lens 46; thereafter as described above, is reflected by the split surface 45a of the polarization beam splitter 45; and is made incident on a predetermined position of the light receiving element 51 through the optical axis composing element 50, and a signal is detected by a predetermined detection mechanism which is not illustrated, though.

Here, the diffraction element 2 in the light focusing optical system 1 of the present invention is provided with first and second diffractive surfaces 21 and 22, in which the light whose wavelength is 630 nm or more and 670 nm or less is diffracted in the first diffractive surface 21 and the light whose wavelength is 400 nm or more and 415 nm or less is diffracted in the second diffractive surface 22.

Figure 3:
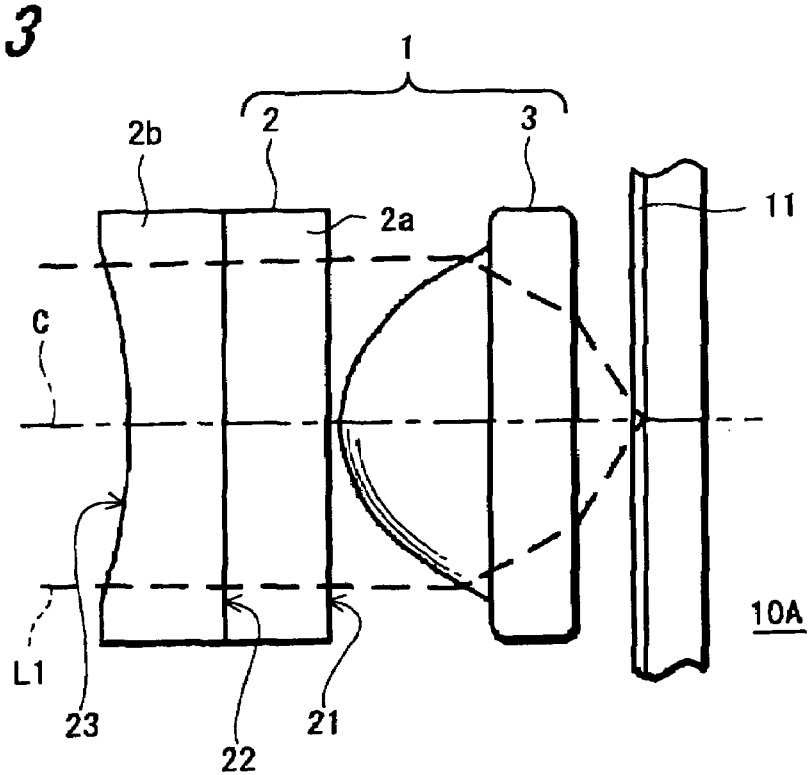
FIG. 3 is a schematic constitutional diagram showing a light focusing optical system according to an embodiment of the present invention.
Figure 4:
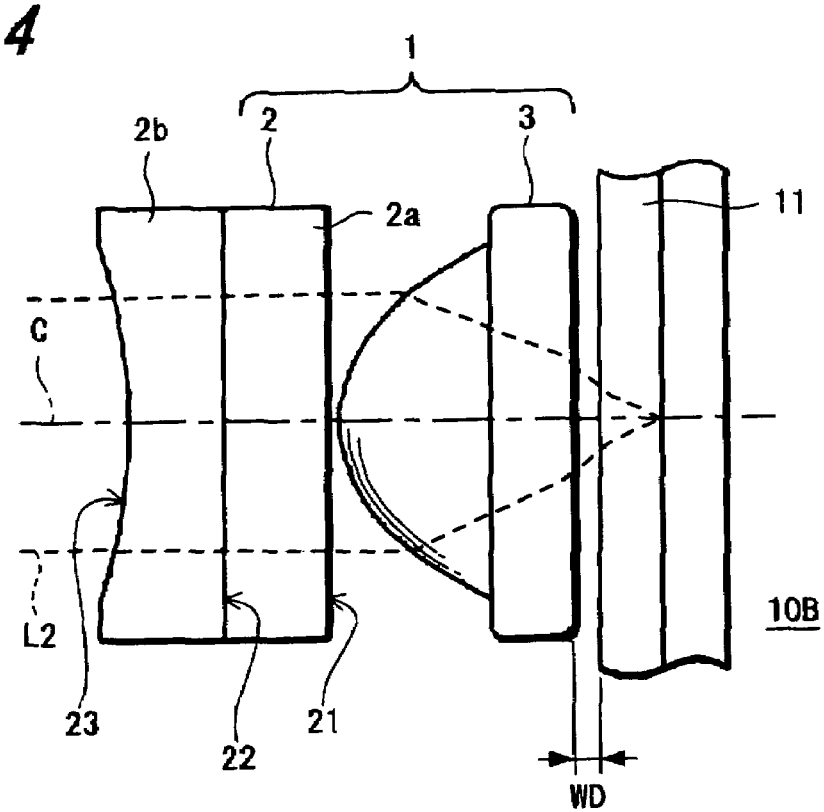
FIG. 4 is a schematic constitutional diagram showing a light focusing optical system according to an embodiment of the present invention.
Figure 5:
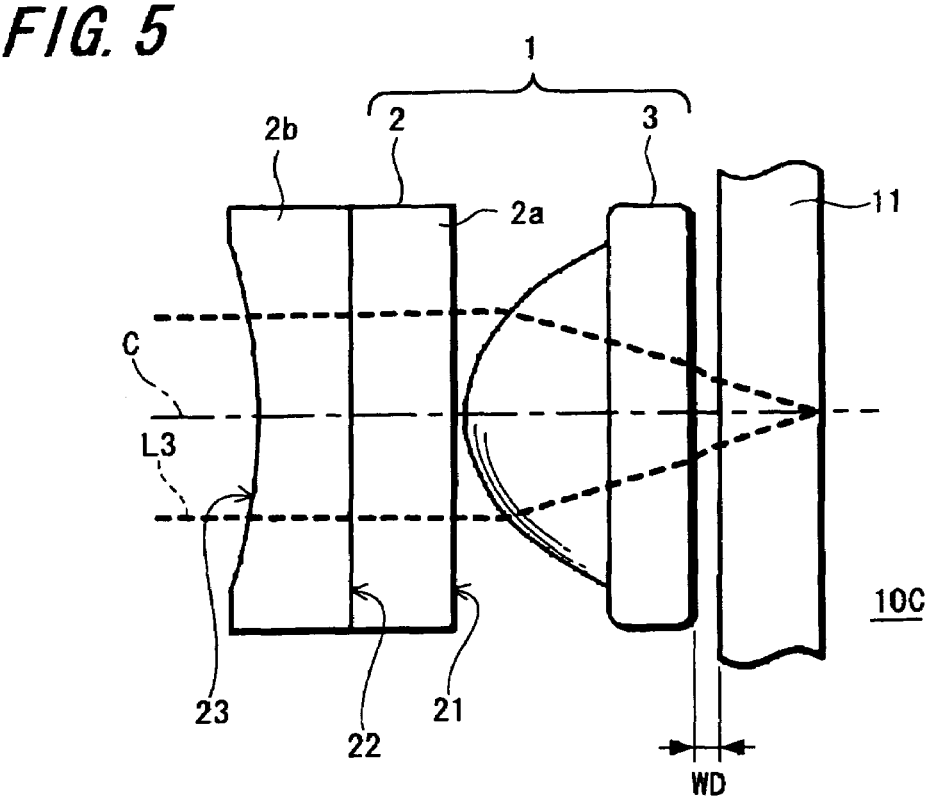
FIG. 5 is a schematic constitutional diagram showing a light focusing optical system according to an embodiment of the present invention.

With respect to the light focusing optical system 1 according to the configuration of the present invention, schematic configurations of examples, in which different kinds of optical recording media are used, are shown in the following FIGS. 3 though 5. In FIGS. 3 through 5, the same reference numerals are given to corresponding portions and a redundant explanation is omitted.

For example, as shown in FIG. 3, the configuration is made such that the recording and/or reproduction is performed using the optical recording medium 10A of the BD as the optical recording medium, for example, among the BD, HD DVD, or AOD, specifically by using light L1 whose wavelength is 400 nm or more and 415 nm or less, and the aberration correction is performed by the second diffractive surface 22 of the diffraction element 2 on the optical recording medium 10A whose cover portion 11 has the thickness of approximately 0.1 mm or 0.6 mm. In FIG. 3, an alternate long and short dash line C denotes an optical axis.

On the other hand, as shown in an schematic configuration of FIG. 4, in a case where another optical recording medium of DVD 10B, for example, is used in this light focusing optical system 1, the configuration is made such that the recording and/or reproduction is performed by using light L2 whose wavelength is 630 nm or more and 670 nm or less, and the aberration correction is performed by the first diffractive surface 21 of the diffraction element 2 on the DVD 10B whose cover portion 11, a light transmissive substrate in this case, has the thickness of approximately 0.6 mm.

Here, in the above-described diffraction element 2, the second diffractive surface is configured to have the positive surface power, and so when the wavelength is altered in such a case that power of the light emitting element is switched from reproducing power to recording power, for example, the chromatic aberration can be corrected excellently by an action in which light beams fluctuated to the long wavelength side are diffracted more toward the optical axis side by this second diffractive surface (for example, refer to section "Chromatic aberration correction lens for optical disk" in page 87 of "Introduction to Diffraction Optical Element", published by Optronics Inc. supervised by Japan Society of Applied Physics, et al.).

In addition, since this second diffractive surface is formed using a combined hologram in which elements 2a and 2b made of materials having different wavelength dependence in a refractive index are joined together and a diffraction grating is formed on a joint surface, the diffraction of light in a different wavelength band is prevented and only the light whose wavelength is 400 nm or more and 415 nm or less can selectively be diffracted with the desired diffraction efficiency.

For example, in case that this second diffractive surface is configured as a boundary surface of different materials, and each of materials is selected to be the material, having the wavelength of 630 nm or more and 670 nm or less and have the compatibility with a CD, which has almost no difference in the wavelength band of 630 nm or more and 780 nm or less, and which has a requiring difference in refractive index in the wavelength band of the wavelength of 400 nm or more and 415 nm or less; and therefore, the diffractive surface which has excellent wavelength selectivity in the diffraction efficiency can be configured.

Furthermore, as shown in an schematic configuration of FIG. 5, where light L3 whose wavelength is about 780 nm is used to perform the reproduction from the CD 10C as the optical recording medium whose cover portion 11 has the thickness of approximately 1.2 mm, a light focusing position to this CD 10C is extended and the working distance WD that is a space between the objective lens 3 and the surface of the optical recording medium 10C is enlarged, when providing at least one aspheric surface 23 having negative refractive power with the light focusing optical system 1 which includes this diffraction element 2.

Here, in the examples explained in FIGS. 3 through 5, the diffraction element 2 is formed of two elements 2a and 2b, the first diffractive surface 21 is provided on a surface of the element 2a facing the lens 3, and the second diffractive surface 22 is provided on the joint surface between the two elements 2a and 2b. Further, the aspheric surface 23 having the negative refractive power is provided on the light source side with respect to the first and second diffractive surfaces 21 and 22, that is, in the diffraction element 2 the opposite side of the element 2b to the objective lens 3. This aspheric surface may be provided on the same surface as the first or second diffractive surface 21 or 22, however by thus providing separately from the first and second diffractive surfaces 21 and 22, there is such advantages that the design flexibility increases, the design flexibility of the diffractive surface is secured, and the diffraction efficiency and the accuracy of aberration correction are not impaired.

As explained above, in the light focusing optical system of the present invention, the first and second diffractive surfaces 21 and 22 are provided as the diffraction element 2, the light whose wavelength is from 630 to 670 nm is diffracted by the first diffractive surface 21 to perform the aberration correction on the optical recording medium whose cover portion has the thickness of approximately 0.6 mm, that is, the aberration correction of the optical recording medium corresponding to the DVD is performed, and the light whose wavelength is from 410 to 415 nm is diffracted by the second diffractive surface 22 to perform the aberration correction on the optical recording medium whose cover portion has the thickness of approximately 0.1 mm or 0.6 mm, that is, the aberration correction of the optical recording medium corresponding to the BD is performed; and so the aberration correction for DVD and for BD is performed excellently using the light focusing optical system 1 having one objective lens 3 and the optical pickup device and optical recording and reproducing device having the compatibility can be obtained.

Furthermore, with providing the aspheric surface having the negative refractive power, the optical pickup device and optical recording and reproducing device in which the light focusing optical system using a single objective lens also has the compatibility with the CD can be provided.

Figure 6:
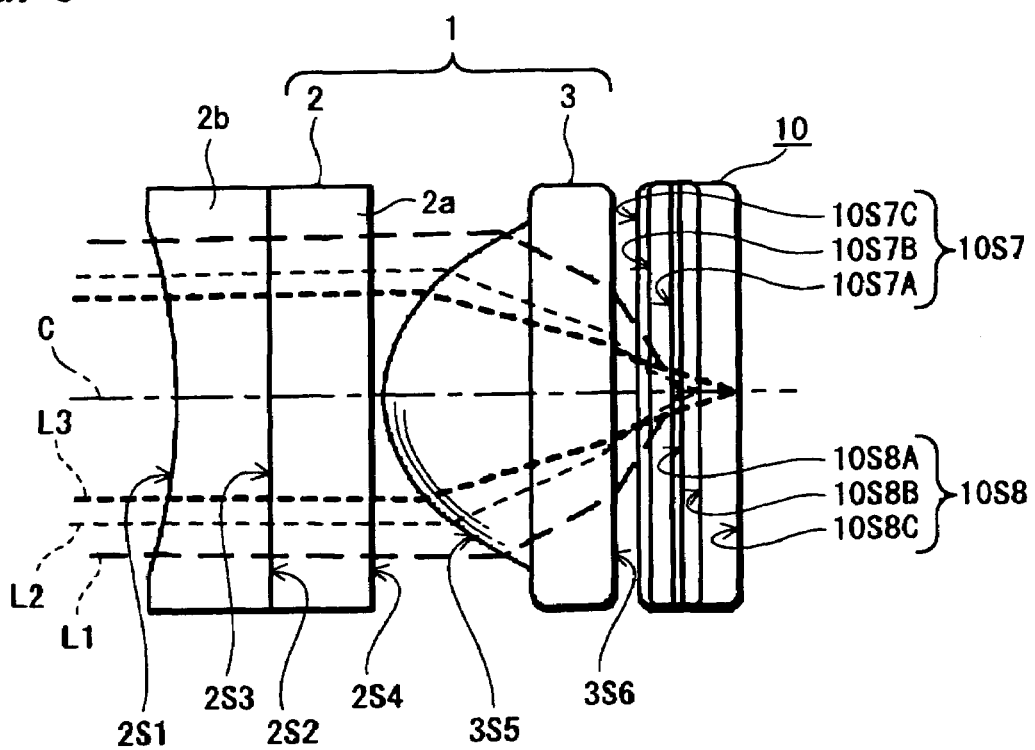
FIG. 6 is a schematic constitutional diagram showing a light focusing optical system according to an embodiment of the present invention.
Figure 7A:
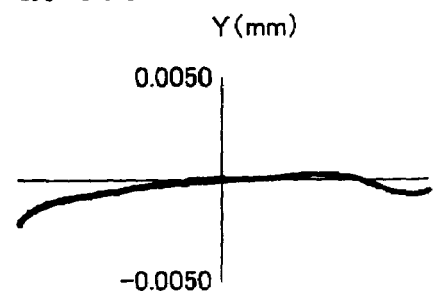
Figure 7B:
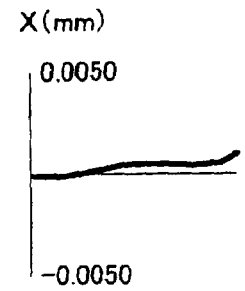
Figure 7C:
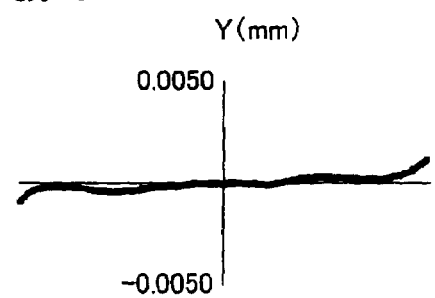
Figure 7D:
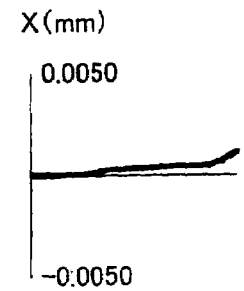
Figure 8A:
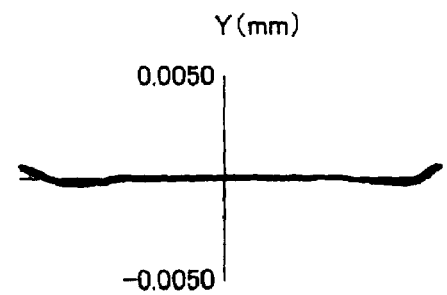
Figure 8B:
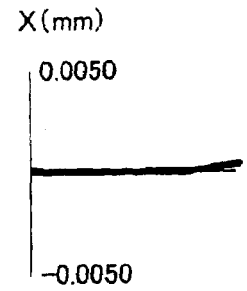
Figure 8C:
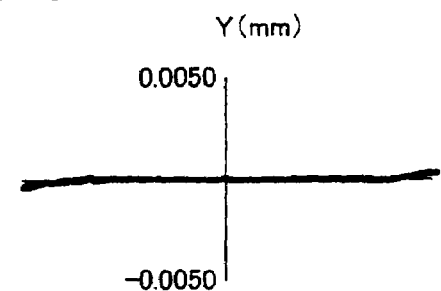
Figure 8D:
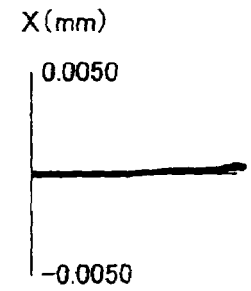
Figure 9A:
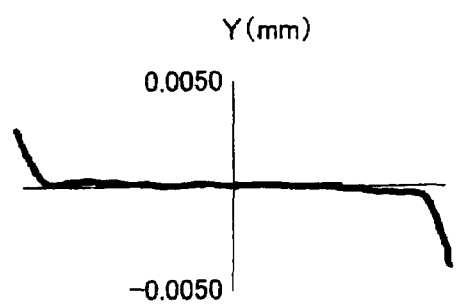
Figure 9B:
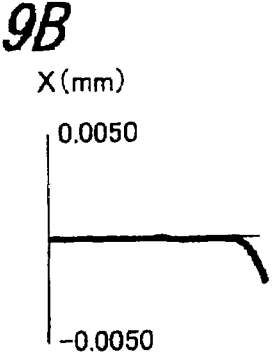
Figure 9C:
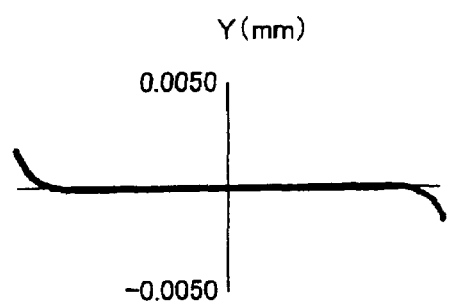
Figure 9D:
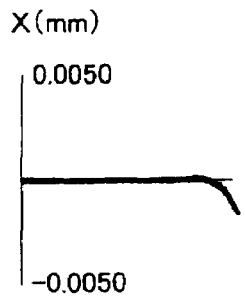

Next, an example of an optical design of the light focusing optical system having such configuration as the present invention is explained. FIG. 6 is a diagram showing a schematic configuration of an example of the light focusing optical system 1 which has the compatibility between the BD, HD DVD or AOD, and the DVD and/or CD, similarly to the above-described example explained in FIGS. 3 through 5.

In FIG. 6, in the diffraction element 2 and objective lens 3 constituting the light focusing optical system 1, boundary surfaces in a light path of laser light for recording and/or reproduction are shown as 2S1, 2S2, 2S3, 2S4, 3S5, and 3S6 from the light source side in order. Further, in the optical recording medium 10, a surface of a cover portion of a BD type optical recording medium is shown as 10S7A, a surface of a cover portion of a DVD type optical recording medium is shown as 10S7B, and a surface of a cover portion of a CD type recording medium is shown as 10S7C among surfaces 10S7 on the object side of the optical recording medium, and also boundary surfaces 10S8 between the cover portion and the recording surface are respectively shown as 10S8A in the BD type optical recording medium, as 10S8B in the DVD type optical recording medium, and 10S8C in the CD type optical recording medium. Further, broken lines L1 through L3 respectively show light for recording and/or reproduction on the optical recording media of BD type, DVD type, and CD type configurations.

Here, in this example, the boundary surface 2S4 on the side of the objective lens 3 of the diffraction element 2 is made into the first diffractive surface, that is, the diffractive surface to diffract light whose wavelength is from 630 to 670 nm and to perform the aberration correction on the optical recording medium whose cover portion has the thickness of approximately 0.6 mm, and the boundary surface 2S3 inside the diffraction element 2 is made into the second diffractive surface, that is, the diffractive surface to diffract light whose wavelength is from 400 to 415 nm and to perform the aberration correction on the optical recording medium whose cover portion has the thickness of approximately 0.1 mm or 0.6 mm. In addition, the boundary surface 2S1 on the light source side of the diffraction element 2 is configured to be the aspheric surface having the negative refractive power.

Next, an example of design data of this light focusing optical system is shown.

First, the following Table 1 shows a curvature radius R of each boundary surface, a thickness on an axis to the next boundary surface (for each wavelength), a medium to the next boundary surface, an aspheric coefficient, and a diffractive surface phase difference coefficient. In Table 1, when the medium to the next boundary surface is glass, a sign thereof is shown, and the refractive index in each wavelength of the glass material shown by each sign is shown in the following Table 2.

TABLE 2

| Glass Sign | Refractive Index | | |
| --- | --- | --- | --- |
| | In Case of Wavelength 785 nm | In Case of Wavelength 658 nm | In Case of Wavelength 407.5 nm |
| G1 | 1.511 | 1.514 | 1.53 |
| G2 | 1.567 | 1.574 | 1.61 |
| G3 | 1.534 | 1.537 | 1.555 |
| G4 | 1.684 | 1.689 | 1.715 |
| G5 | 1.569 | 1.577 | 1.616 |

Here, in the above Table 1, an aspheric formula shown in the following formula 1 was used as the aspheric coefficient.

$$X = \frac{Y^2/R}{1+\{1-(1+K)(Y/R)^2\}^{1/2}} + AY^4 + BY^6 + CY^8 + DY^{10} + EY^{12} + FY^{14} + GY^{16} \quad \text{[Formula 1]}$$

where, X: depth from surface apex [mm]
Y: height from optical axis [mm]
R: curvature radius [mm]

TABLE 1

| Boundary Surface | R(Curvature Radius)(mm) | Thickness on axis to next boundary surface (mm) | | | Medium to next Boundary Surface | Aspheric Coefficient | Phase Difference Coefficient of Diffractive surface |
| --- | --- | --- | --- | --- | --- | --- | --- |
| | | In Case of Wavelength 785 mm | In Case of Wavelength 658 mm | In Case of Wavelength 407.5 mm | | | |
| 2S1 (Aspheric Surface) | −19.9874 | 1.25 | 1.25 | 1.25 | Class G1 | K:0<br>A:0.00157379<br>B:0.000386239<br>C:0<br>D:0<br>E:0<br>F:0<br>G:0 | — |
| 2S2 | Infinite | 0.02 | 0.02 | 0.02 | Class G2 | — | — |
| 2S3 (Diffractive Surface) | Infinite | 1.25 | 1.25 | 1.25 | Class G3 | — | C1:−0.0099963<br>C2:0.00083627<br>C3:0.00031581<br>C4:−0.000076189<br>C5:0.000024255<br>C6:−0.000002346 |
| 2S4 (Diffractive Surface) | Infinite | 0.1 | 0.1 | 0.1 | Air | — | C1:−0.0075752<br>C2:0.0000802<br>C3:0.00021014<br>C4:−0.000059678<br>C5:0.00000584<br>C6:−0 |
| 3S5 (Aspheric Surface) | 1.7438 | 2.75 | 2.75 | 2.75 | Class G4 | K:−0.617948<br>A:0.00554838<br>B:0.000105077<br>C:0.000385697<br>D:−0.0000606036<br>E:−0.0000105483<br>F:0.0000107304<br>G:−0.00000185118 | — |
| 3S6 (Aspheric Surface) | −16.36466 | 2.75 | 0.547 | 0.784992 | Air | K:−3714.9878<br>A:0.0546054<br>B:−0.0313144<br>C:0.00139105<br>D:0.00239472<br>E:0.0012811<br>F:−0.00118713<br>G:0.0021 | — |
| 10S7 | Infinite | 1.2 | 0.6 | 0.0875 | Class G5 | — | — |
| 10S8 | Infinite | 0 | 0 | 0 | — | — | — |

K: conical constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$
G: aspheric coefficient of term $Y^{16}$ Also, as to the phase difference coefficient of diffractive surface, a phase polynomial shown in the following formula 2 was used.

$$OPD = C1Y^2 + C2Y^4 + C3Y^6 + C4Y^8 + C5Y^{10} + C6Y^{12} \quad \text{[Formula 2]}$$

where, OPD: phase difference from axis [mm]
Y: height from optical axis [mm]

Lateral aberration with respect to the CD, DVD, and BD was calculated using the light focusing optical system based on such design. Results are shown in FIGS. 7 through 9.

FIGS. 7A to 7D show a case where the CD is used, FIGS. 8A to 8D show a case where the DVD is used, and FIGS. 9A to 9D show a case where the BD is used, wherein FIGS. 7A, 8A, 9A and 7B, 8B, 9B are diagrams showing the lateral aberration in the Y direction and in the X direction orthogonal thereto, respectively, when a light beam is incident in the Y direction orthogonal to the optical axis with a field angle of 0.5°, and 7C, 8C, 9C and 7D, 8D, 9D are diagrams showing the lateral aberration in the Y direction and in the X direction on the axis, respectively.

As is obvious from the results of FIGS. 7 through 9, it is verified that the lateral aberration is suppressed in this light focusing optical system in any of the optical recording media CD, DVD, and BD.

Figure 10:
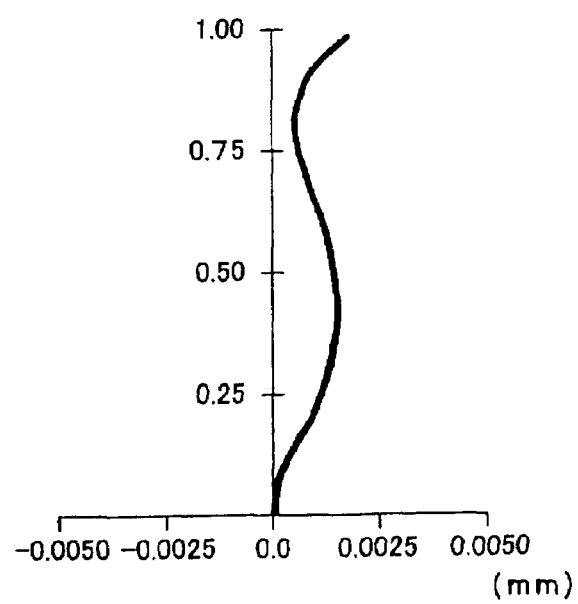
FIG. 10 is a diagram showing spherical aberration with respect to the CD in an embodiment of the light focusing optical system according to the present invention.
Figure 11:
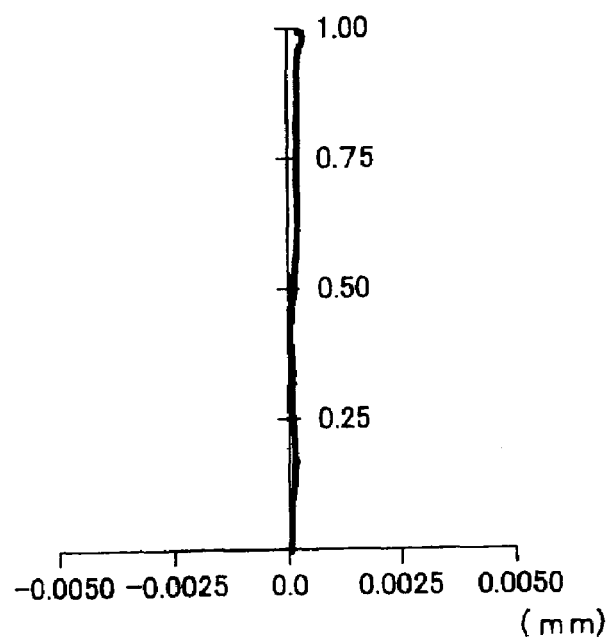
FIG. 11 is a diagram showing the spherical aberration with respect to the DVD in an embodiment of the light focusing optical system according to the present invention.
Figure 12:
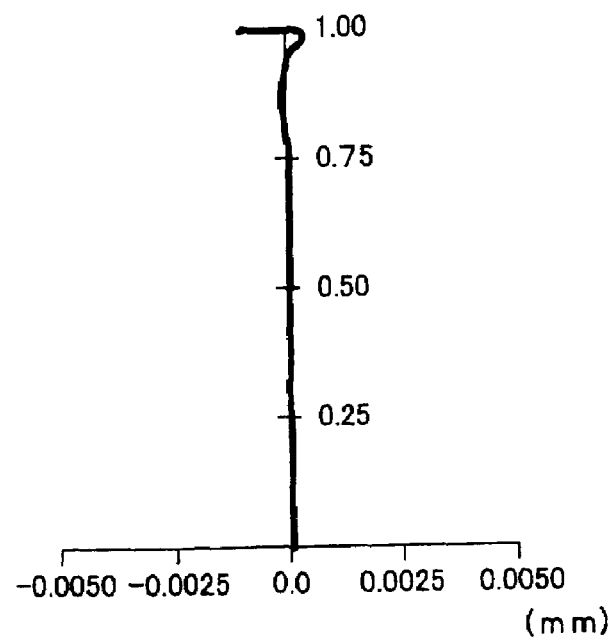
FIG. 12 is a diagram showing the spherical aberration with respect to the BD in an embodiment of the light focusing optical system according to the present invention.

Further, spherical aberration with respect to the CD, DVD, and BD was also calculated. Results are shown in FIGS. 10 through 12, respectively. It is verified that all the spherical aberration to the CD shown in FIG. 10, spherical aberration to the DVD shown in FIG. 11, and spherical aberration to the BD shown in FIG. 12 are suppressed low.

In this light focusing optical system, when each of optical recording media of BD, DVD, and CD is used, a focal length, numerical aperture, wavelength, magnification, object-image distance, working distance, thickness of cover portion, chromatic aberration in case of wavelength fluctuation +1 nm, aberration characteristic on axis, and aberration characteristic outside axis (in case of 0.5°) are shown in the following Table 3.

TABLE 3

| Use | BD | DVD | CD |
|---|---|---|---|
| Focal Length [mm] | 2.32 | 2.388 | 2.489 |
| Numerical Aperture | 0.85 | 0.65 | 0.5 |
| Wavelength [nm] | 407.5 | 658 | 785 |
| Magnification | 0 | 0 | 0 |
| Object-Image Distance [mm] | Infinite | Infinite | Infinite |
| Working Distance [mm] | 0.785 | 0.547 | 0.275 |
| Thickness of Cover Portion [mm] | 0.0875 | 0.6 | 1.2 |
| Chromatic Aberration (Wavelength Fluctuation + 1 nm) [μm] | 0.483 | 0.003 | 0.063 |
| Aberration Characteristic on Axis [λrms] | 0.004 | 0.002 | 0.009 |
| Aberration Characteristic outside Axis (0.5 deg.) [λrms] | 0.035 | 0.013 | 0.038 |

From the result in this Table 3, it is verified that the chromatic aberration is controlled to be a practical numerical value with respect to each optical recording medium of BD, DVD, and CD, and in addition, it is verified that both the aberration characteristic on axis and the aberration characteristic outside axis are also controlled to be sufficiently a low level.

Here, in a light focusing optical system based on the similar design, when the diffractive surface is not provided on the boundary surface 2S3, the chromatic aberration with respect to the BD was 0.541. Specifically, it is verified that the chromatic aberration was suppressed excellently by providing the diffraction surface corresponding to the BD with this boundary surface 2S3.

As explained above, according to the light focusing optical system of the present invention, the aberration correction can be performed excellently on various kinds of optical recording media of the BD type, DVD type, and CD type by the optical system using one objective lens, the compatibility between three different kinds of optical recording media can be obtained by. applying this light focusing optical system to the optical pickup device and optical recording and reproducing device, and also the miniaturization, thinness, and reduction in weight of the device become possible.

It should be understood by those skilled in the art that the present invention is not limited to the configurations explained in the embodiments described above but various modifications, combinations, sub-combinations and alterations may occur depending on design requirements and other factors insofar as they are within the scope of the appended claims or the equivalents thereof.

For example, in the light focusing optical system based on the above-described design example, it is also possible to configure a light focusing optical system corresponding to the HD DVD and AOD instead of the BD to have the compatibility with the CD and DVD.

It should be understood by those skilled in the art that various modifications, combinations, sub-combinations and alterations may occur depending on design requirements and other factors insofar as they are within the scope of the appended claims or the equivalents thereof.

What is claimed is:

1. A light focusing optical system comprising:
a diffraction element and lens with which light for recording to and/or reproducing from a plurality of optical recording media of different kinds is focused onto the optical recording media,
said diffraction element including two elements in physical contact, said two elements in contact along a boundary surface, wherein said diffraction element has at least first and second diffractive surfaces; said first diffractive surface diffracts light whose wavelength is 630 nm or more and 670 nm or less to perform aberration correction on an optical recording medium whose cover layer on which light is incident has a thickness of approximately 0.6 mm; and said second diffractive surface diffracts light whose wavelength is 400 nm or more and 415 nm or less to perform aberration correction on an optical recording medium whose cover layer on which light is incident has a thickness of approximately 0.1 mm or approximately 0.6 mm, one of said first and second diffractive surfaces is the boundary surface, a surface of one of the two elements being an aspheric surface with a negative refractive power.

2. The light focusing optical system according to claim 1, wherein said second diffractive surface has positive surface power.

3. The light focusing optical system according to claim 1, wherein a diffraction grating is provided on the boundary surface where materials having different wavelength dependence in a refractive index are joined to form said second diffractive surface.

4. The light focusing optical system according to claim 3, wherein said diffraction grating is formed by joining the two elements.

5. The light focusing optical system according to claim 1, wherein said aspheric surface having the negative refractive power is provided on the light source side of said first and second diffractive surfaces.

6. The light focusing optical system according to claim 1, wherein said aspheric surface having the negative refractive power is provided on the light source side of said first and second diffractive surfaces, the second diffractive surface is the common surface, and the first diffractive surface is a surface furthest from the light source side.

7. The light focusing optical system according to claim 1, wherein said aspheric surface having the negative refractive power is provided on the first diffractive surface.

8. The light focusing optical system according to claim 1, wherein said aspheric surface having the negative refractive power is provided on the second diffractive surface.

9. An optical pickup device including a light focusing optical system in which light for recording to and/or reproducing from a plurality of optical recording media of different kinds is focused onto the recording media, comprising:
a light source that emits light, a diffraction element on which the light emitted from the light source is incident, and a lens that focuses light from the diffraction element toward the optical recording medium, said diffraction element including two elements in physical contact, said two elements in contact along a boundary surface, wherein said diffraction element has at least first and second diffractive surfaces, said first diffractive surface diffracts light whose wavelength is 630 nm or more and 670 nm or less to perform aberration correction on an optical recording medium whose cover layer on which light is incident has a thickness of approximately 0.6 mm; and said second diffractive surface diffracts light whose wavelength is 400 nm or more and 415 nm or less to perform aberration correction on an optical recording medium whose cover layer on which light is incident has a thickness of approximately 0.1 mm or approximately 0.6 mm, one of said first and second diffractive surfaces is the boundary surface, a surface of one of the two elements being an aspheric surface with a negative refractive power.

10. The optical pickup device according to claim 9, wherein said second diffractive surface has positive surface power.

11. The optical pickup device according to claim 9, wherein a diffraction grating is made on the boundary surface where materials having different wavelength dependence in a refractive index are joined to form said second diffractive surface.

12. The optical pickup device according to claim 11, wherein said diffraction grating is made by joining the two elements.

13. The optical pickup device according to claim 9, wherein said aspheric surface having the negative refractive power is provided on the light source side of said first and second diffractive surfaces.

14. An optical recording and reproducing device including at least a light focusing optical system in which light for recording to and/or reproducing from a plurality of optical recording media of different kinds is focused onto the optical recording media comprising:
a light source that emits light,
a diffraction element on which the light emitted from the light source is incident, said diffraction element including two elements in physical contact, said two elements in contact along a boundary surface, and
a lens that focuses light from the diffraction element toward the optical recording medium,
wherein said diffraction element has at least first and second diffractive surfaces, said first diffractive surface diffracts light whose wavelength is 630 nm or more and 670 nm or less to perform aberration correction on an optical recording medium whose cover layer on which light is incident has a thickness of approximately 0.6 mm; and said second diffractive surface diffracts light whose wavelength is 400 nm or more and 415 nm or less to perform aberration correction on an optical recording medium whose cover layer on which light is incident has a thickness of approximately 0.1 mm or approximately 0.6 mm, one of said first and second diffractive surfaces is the boundary surface, a surface of one of the two elements being an aspheric surface with a negative refractive power.

15. The optical recording-reproducing device according to claim 14, wherein said second diffractive surface has positive surface power.

16. The optical recording-reproducing device according to claim 14, wherein a diffraction grating is made on the boundary surface where materials having different wavelength dependence in a refractive index are joined to form said second diffractive surface.

17. An optical recording-reproducing device according to claim 16, wherein said diffraction grating is made by joining the two elements.

18. The optical recording-reproducing device according to claim 14, wherein said aspheric surface having the negative refractive power is provided on the light source side of said first and second diffractive surfaces.

19. A method of focusing light for recording to and/or reproducing from a plurality of optical recording media of different kinds onto the optical recording media by using a diffraction element and lens, comprising:
providing said diffraction element with at least first and second diffractive surfaces, said diffraction element including two elements in physical contact, said two elements in contact along a boundary surface, said first diffractive surface diffracting light whose wavelength is 630 nm or more and 670 nm or less to perform aberration correction on an optical recording medium whose cover layer on which light is incident has a thickness of approximately 0.6 mm; and said second diffractive surface diffracting light whose wavelength is 400 nm or more and 415 nm or less to perform aberration correction on an optical recording medium whose cover layer on which light is incident has a thickness of approximately 0.1 mm or approximately 0.6 mm, one of said first and second diffractive surfaces is the boundary surface, a surface of one of the two elements being an aspheric surface with a negative refractive power.

* * * * *